US008592101B2

(12) United States Patent
Donet et al.

(10) Patent No.: US 8,592,101 B2
(45) Date of Patent: Nov. 26, 2013

(54) ELECTROLYTE COMPRISING YSZ FOR SOFC BATTERY, AND METHOD COMPRISING CVD FOR MAKING SAME

(75) Inventors: Sébastien Donet, Meaudre (FR); Christelle Anglade, Saint Pierre de Message (FR); Bertrand Morel, Grenoble (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 275 days.

(21) Appl. No.: 13/063,360

(22) PCT Filed: Aug. 24, 2009

(86) PCT No.: PCT/FR2009/051617
§ 371 (c)(1),
(2), (4) Date: May 24, 2011

(87) PCT Pub. No.: WO2010/029242
PCT Pub. Date: Mar. 18, 2010

(65) Prior Publication Data
US 2011/0236794 A1    Sep. 29, 2011

(30) Foreign Application Priority Data
Sep. 11, 2008  (FR) .................................... 08 56120

(51) Int. Cl.
*H01M 8/00* (2006.01)
*H01M 8/12* (2006.01)
*B05D 5/12* (2006.01)

(52) U.S. Cl.
USPC ............ 429/535; 429/495; 429/496; 427/115

(58) Field of Classification Search
USPC ................ 429/495, 465, 488, 489, 535, 496; 428/548; 427/115; 204/192.15, 192.17
See application file for complete search history.

(56) References Cited

U.S. PATENT DOCUMENTS

| | | | |
|---|---|---|---|
| 5,106,654 A | 4/1992 | Isenberg | |
| 5,753,383 A | 5/1998 | Cargnelli et al. | |
| 6,007,683 A | 12/1999 | Jankowski et al. | |
| 6,811,741 B2 | 11/2004 | Pham et al. | |
| 7,190,568 B2 | 3/2007 | Wood et al. | |
| 2001/0026890 A1* | 10/2001 | Ono et al. | 429/189 |
| 2002/0042165 A1 | 4/2002 | Putkonen | |
| 2003/0157386 A1* | 8/2003 | Gottmann et al. | 429/26 |
| 2004/0096572 A1 | 5/2004 | Chen et al. | |
| 2005/0095495 A1* | 5/2005 | Yamada et al. | 429/44 |
| 2007/0218310 A1* | 9/2007 | Schuisky | 428/548 |

FOREIGN PATENT DOCUMENTS

WO    2009/023383 A    2/2009

OTHER PUBLICATIONS

"Microstructural and Electrical Properties of Gadolinium Doped Ceria Thin Films Prepared by Atomic Layer Deposition (ALD)", Gourba et al., Electrochemical Society Proceedings vol. 2003-2007, p. 267-270.*
International Search Report for PCT/FR2009/051617, dated Mar. 12, 2009.

(Continued)

*Primary Examiner* — Kenneth Douyette
(74) *Attorney, Agent, or Firm* — Heslin Rothenberg Farley & Mesiti P.C.

(57) ABSTRACT

The invention relates to a method for manufacturing an electrolyte for an SOFC battery comprising a CVD (chemical vapor deposition) deposition step, on a substrate, of a stack of at least three layers of materials YSZ/X/YSZ, X being a different material than YSZ.

17 Claims, 4 Drawing Sheets

(56) References Cited

OTHER PUBLICATIONS

Horita, T. et al., "Ceria-Zirconia Composite Electrolyte for solid Oxide Fuel Cells" Journal of Electroceramics, Kluwer Academic Publishers, BO. vol. 1:2. Jan. 1, 1997.

Garcia, G. et al., "Preparation of YSZ layers by MOCVD: Influence of experimental parameters on the morphology of the films" Journal of Crystal Growth, Elsevier, Amsterdam, NL. vol. 156, No. 4, Dec. 1, 1995.

Siadati M. H. et al., "CVD of CEO2-doped Y2O3-stabilized Zirconia onto Dense and Porous Substrates" Chemical Vapor Deposition, Wiley-VCH Verlag, Weinheim, DE. vol. 3, No. 6, Nov. 1, 1997.

Meng, G. et al., "Novel CVD Techniques for Micro and IT-SOFC Fabrication" Fuel Cells. vol. 4, No. 1-2, 2004.

B.C.H. Steele, J.Materials Science, 36, (2001), 1053.

T. Mori, J. Drennan, Y. Wang, J.H. Lee, J.G. Li, T. Ikegami, J.Electrochem.Soc, 150(6), 2003, A665-73.

T. Mori, T. Ikegami, H. Yamamura, J.Electrochem.Soc, 146,(12), 1999,4380-85.

L. Vasylechko, V. Vashook, D. Savytskii, A. Senyshyn, R. Niewa, M. Knapp, U. Ullmann, M. Berkowski, A. Matkovskii, U. Bismayer, J.Solid State Chem, 172, 2003, 396.

S. Donet, F. Weiss, J.P. Senateur, P. Chaudouet, A. Abrutis, A. Teiserskis, Z. Saltyte, D. Selbmann, J. Eickmeyer, O. Stadel, G. Wahl, C. Jimenez, U. Miller, Physica C 372-376 (2002): 652.

\* cited by examiner

ELECTROLYTE COMPRISING YSZ FOR SOFC BATTERY, AND METHOD COMPRISING CVD FOR MAKING SAME

CROSS REFERENCE TO RELATED APPLICATIONS

This application is a national stage filing under section 371 of International Application No. PCT/FR2009/051617 filed on Aug. 24, 2009, and published in French on Mar. 18, 2010 as WO 2010/029242 and claims priority of French application No. 0856120 filed on Sep. 11, 2008, the entire disclosure of these applications being hereby incorporated herein by reference.

SCOPE OF THE INVENTION

The present invention relates to the field of SOFC ("solid oxide fuel cell") type batteries, and also to thermal barrier layers and diffusion layers.

More specifically, it proposes the use of the chemical deposition technique in the vapour phase, called CVD ("chemical vapour deposition") to obtain an electrolyte. Indeed, controlling the parameters for this method modulates the morphology of the grains, the crystallographic structure of the materials deposited, and their dispersion.

Accordingly, through this technology, it is possible to deposit in situ a heterostructure having the properties required for an electrolyte of an SOFC battery.

PRIOR STATE OF THE ART

An SOFC type battery is composed of an electrolyte sandwiched between a cathode and an anode.

As shown in FIG. 1, in an SOFC type battery, the oxidant, on the cathode side (air, $O_2$), is reduced by electrons coming from the anode, and the fuel ($CH_4$, $H_2$, methanol), on the anode side, is oxidized by the oxygen ions coming from the cathode. According to the type of electrode used (anionic or protonic conduction), one of the two ions formed ($O^{2-}$ or $H^+$) crosses the electrolyte to react with oxygen or hydrogen, thereby forming water. This reaction takes place at high temperature.

The most commonly used materials in SOFC type batteries are:
  YSZ (yttria stabilized zirconium) for the electrolyte;
  a cermet for the anode, i.e. a metallic ceramic or nickel dispersed on stabilized zirconium (Ni—YSZ); and
  a perovskite of the $La_xSr_yMnO_3$ type for the cathode.

Batteries operate at high temperature, generally between 800° C. and 1000° C., because of the conduction properties of the yttria stabilized zirconium as electrolyte. So YSZ electrolyte is certainly a good ionic conductor, but only at high temperature.

The relative effects of temperature and membrane thickness show that the ionic conductivity ($\sigma$) of materials as a function of temperature depends on the materials used. Accordingly, according to Steele (1), the specific resistance $R_o$ of the electrolyte must not exceed 0.15 $\Omega.cm^2$. It appears that $(ZrO_2)_{0.9}(Y_2O_3)_{0.1}$ reaches this conductivity value for a temperature of 700° C., whereas the doped cerine $Ce_{0.9}Gd_{0.1}O_{1.95}$ and the perovskite LaSrGaMgO reach it from 500° C.

The work of Mori et al. (2, 3), done on $CeO_2$ doped with $Gd_2O_3$, confirmed these values, whereas Vasylechko et al. (4) recommended using perovskite $LaGaO_3$ substituted with LaSrGaMgO to replace the YSZ. These doped oxides are the most serious contenders for replacing YSZ. However, at high temperature, the doped cerine is unstable in a reducing atmosphere and becomes a proton conductor.

Currently, the minimum thicknesses for the dense electrolyte obtained by industrial methods, mainly by the liquid route, are of the order of 10 to 15 micrometres, while on the laboratory scale, the best performance obtained with thin layers has been reached with films 5 micrometres thick.

Large-scale commercial applications of SOFC type fuel cells would require the operation temperature to drop to around 500-700° C. This would reduce the cost connected to the use of ceramics and high-resistance metals, of the Inconel type, at high temperature.

One of the current problems in the field of SOFC type batteries lies in the difficulty of making thin films, less than 5 micrometres thick, of the YSZ electrolyte. Indeed, reducing the ohmic resistance of the electrolyte would increase the power density of the battery.

Thanks to low electrolyte resistance, the battery could thus function at lower temperature (of the order of 500-600° C.), which would reduce the volume and the costs of the SOFC battery for a given power.

In this perspective, there is therefore the need to develop new materials for the electrolyte, both from the point of view of their chemical composition and their shape, and to reduce the thickness of the electrolyte to be able to reduce the operating temperature and increase yield (by reducing the ionic resistance of the electrolyte).

Accordingly and as an illustration, making sealed membranes 1 micrometre thick or less and that can be up to 3 micrometres would reduce the operating temperature to around 500° C. for YSZ and to around 250° C. for $Ce_{0.9}Gd_{0.1}O_{1.95}$ or $SrTiO_3$ doped with Nb.

Simultaneously, a reduction in operating temperature would mean the materials of the interconnectors, the anode and the cathode could be replaced by less expensive materials with better electro-catalytic activity.

Minh et at (5) have shown that the ionic conductivity at the grain joints is much lower for bulk electrolyte materials tested. Accordingly, by developing crystallographically oriented layers of electrolyte, the disorientation at the grain joints could be greatly reduced, accordingly reducing the ionic conductivity and reducing the electrolyte resistance in the same way.

Different deposition techniques have accordingly been tested to make thin layers of YSZ as electrolyte.

First, by wet route, an advantageous solution has been described in U.S. Pat. No. 6,811,741 on an aerosol-gel technique. Nevertheless, drying and heat treatment steps required and problems of residual porosity reduce permeation performances for the layers formed that way.

Secondly, routes of depositing thin layers by vacuum technologies have been widely explored.

Accordingly, Donet et al. (6,7) have reported making films of YSZ, $Y_2O_3$, and $CeO_2$ on NiO supports.

U.S. Pat. No. 5,753,383 uses magnetron reactive PVD ("physical vapour deposition") and MOCVD ("Metal-Organic Chemical Vapour Deposition") deposition to make YSZ deposits.

U.S. Pat. No. 5,106,654 describes a method whereby dilatation coefficients are matched inside the structure of an SOFC by developing a tubular structure, in place of conventional planar structures.

US Document 2004/0096572 describes a method of making an SOFC in thin layers. In this document, the YSZ electrolyte is made either using PVD (IBAD, "Ion Beam Assisted Deposition"), or by MOCVD. Accordingly, a YSZ/SmCeO$_2$ structure has been tested.

Elsewhere, U.S. Pat. No. 7,190,568 describes a conducting heterostructure that can be used as an electrolyte. Multilayers made of perovskites having the structure La$_{1-x}$E$_x$Co$_{0.6}$Ni$_{0.4}$O$_3$ (E: rare earth) are deposited by screen printing then undergo a heat treatment.

It appears that the solutions of the prior art have the following limits and drawbacks:
- application limited to a monolayer of YSZ or to perovskite materials with complex structures;
- liquid route requiring several stages (drying, heat treatment) and causing porosity; or
- vacuum deposition route, by PVD, with a column-based structure and/or internal constraints requiring the layers made to be thick, at least 5 micrometres thick.

Thus these solutions cannot be integrated into portable low-power systems. Therefore, there is a need to develop more powerful, novel, technical solutions for electrolytes of the SOFC type.

DESCRIPTION OF THE INVENTION

The present invention is based on use of the CVD (chemical vapour deposition) deposition technique, and more specifically MO-CVD ("Metal Organic Chemical Vapour Deposition"), to make, on a substrate, a membrane, in particular an electrolyte for SOFC batteries.

Such an electrolyte is essentially made of yttria stabilized zirconium (YSZ) but, in an original manner, comprises at least one heterogeneous trilayer having the sequence YSZ/X/YSZ. In the scope of the invention, the stack of three layers is called a "trilayer". As is suggested by the idea of "heterogeneous trilayer", X is a material other than YSZ.

Accordingly, through the device used, it is possible to make continuous films of YSZ on porous substrates at the operating temperature of the SOFC battery (between 600 and 700° C.), leading accordingly to a reduction of intrinsic and interfacial constraints.

The substrate onto which the deposits are made is advantageously a cermet, in particular having the composition Ni/NiO+YSZ.

Making crystallographically oriented multilayers reduces constraints inside the electrolyte, through changing the mesh parameters and dilatation coefficients between the materials. The result is a heterostructure with better film densification.

As already stated, the material X deposited between the two layers of YSZ is not YSZ. It is advantageously selected from among the group comprising: Y$_2$O$_3$, CeO$_2$:Gd, SrTiO$_3$:Nb, Bi$_2$O$_3$, or a mixture of these materials.

A useful summary of the characteristics of the various materials used in the scope of the present invention is given in the table below:

| Material | Crystalline structure | T$_m$/° C. | Lattice constant (300K) | Plane space (nm) | Misfit to Ni (%) | Misfit to NiO (%) |
|---|---|---|---|---|---|---|
| Ni | cfc | 1455 | 3.52 | 3.52 | 0.00 | −18.47 |
| YSZ | cubic/fluorite | 2680 | 5.13 | 3.63 | 3.03 | −14.88 |
| Gd$_2$Zr$_2$O$_7$ | cubic/pyrochlore | | 10.52 | 3.72 | 5.38 | −12.10 |
| Y$_2$O$_3$ | cubic/Mn$_2$O$_3$ | >2400 | 10.6 | 3.75 | 6.13 | −11.20 |
| LaAlO$_3$ | rhombohedric/perovskite | 2100 | 5.36 | 3.79 | 7.12 | −10.03 |
| La$_2$Zr$_2$O$_7$ | cubic/pyrochlore | 2300 | 10.8 | 3.81 | 7.61 | −9.45 |
| Gd$_2$O$_3$ | cubic/Mn$_2$O$_3$ | >2400 | 10.81 | 3.82 | 7.85 | −9.16 |
| CaTiO$_3$ | orthorhombic/perovskite | | 5.38 × 5.44 | 3.82 | 7.85 | −9.16 |
| CeO$_2$ | cubic/fluorite | 2600 | 5.41 | 3.83 | 8.09 | −8.88 |
| Eu$_2$O$_3$ | cubic/Mn$_2$O$_3$ | >2300 | 10.87 | 3.84 | 8.33 | −8.59 |
| LaNiO$_3$ | rhombohedric/perovskite | | 5.45 | 3.84 | 8.33 | −8.59 |
| NdGaO$_3$ | orthorhombic/perovskite | 1670 | 5.43 × 5.5 | 3.86 | 8.81 | −8.03 |
| Sm$_2$O$_3$ | cubic/Mn$_2$O$_3$ | >2300 | 10.93 | 3.86 | 8.81 | −8.03 |
| La$_2$NiO$_4$ | tetragonal | | 3.86 | 3.86 | 8.81 | −8.03 |
| Sr$_2$RuO$_4$ | tetragonal | | 3.87 | 3.87 | 9.04 | −7.75 |
| LSMO | rhombohedric/perovskite | | 5.49 | 3.88 | 9.28 | −7.47 |
| Pd | cfc | 1555 | 3.89 | 3.89 | 9.51 | −7.20 |
| Gd$_2$CuO$_4$ | tetragonal | | 3.89 | 3.89 | 9.51 | −7.20 |
| SrTiO$_3$ | cubic/perovskite | 2080 | 3.91 | 3.91 | 9.97 | −6.65 |
| LaMnO$_3$ | orthorhombic/perovskite | | 5.54 × 5.74 | 3.91 | 9.97 | −6.65 |
| Nd$_2$O$_3$ | cubic/Mn$_2$O$_3$ | >2300 | 11.08 | 3.92 | 10.20 | −6.38 |
| SrRuO$_3$ | orthorhombic/perovskite | | 5.57 × 5.54 | 3.93 | 10.43 | −6.11 |
| Nd$_2$CuO$_4$ | tetragonal | | 3.94 | 3.94 | 10.66 | −5.84 |
| BaTiO$_3$ | tetragonal/perovskite | | 3.99 | 3.99 | 11.78 | −4.51 |
| Ag | cfc | 961 | 4.09 | 4.09 | 13.94 | −1.96 |
| SrZrO$_3$ | orthorhombic/perovskite | 2800 | 5.79 × 5.82 | 4.10 | 14.14 | −1.70 |
| NiO | cubic/NaCl | 1984 | 4.17 | 4.17 | 15.59 | 0.00 |
| BaZrO$_3$ | cubic/NaCl | 2690 | 4.19 | 4.19 | 15.99 | 0.48 |
| MgO | cubic/NaCl | 3100 | 4.21 | 4.21 | 16.39 | 0.95 |
| TiN | cubic/NaCl | | 4.24 | 4.24 | 16.98 | 1.65 |

In a conventional manner, the CVD deposit uses precursors selected from among alkoxide, β-diketonate, carboxylate, metal salt precursors.

According to a preferred embodiment, the precursors used are as follows:
Y(thd)$_3$ in Zr(thd)$_2$ precursor for an YSZ layer;
Y(thd)$_3$ precursor for a Y$_2$O$_3$ layer;
Ce(thd)$_3$ and Gd(thd)$_3$ precursors for a CeO$_2$:Gd layer;
Sr(thd)$_2$, Ti(O$^i$Pr) and Nb(thd)$_4$ precursors for a SrTiO$_3$:Nb layer.

Elsewhere and before heat treatment, the interface layer that is between the two layers of YSZ advantageously has a thickness from 10 to 100 nanometres, even more advantageously equal to 50 nanometres.

Once deposited, this heterostructure undergoes a heat treatment between 650 and 850° C., for a duration of 1 to 5 hours, under an oxygen atmosphere from 20 to 100% as a function of the duration and the treatment temperature. First, this completely oxygenates the cermet, and second, this diffuses the layer of X within the two layers of YSZ under-doped in X. Accordingly, this treatment can make the true layer of X itself disappear, and create a diffuse interface between the two layers of YSZ.

According to a preferred embodiment, at least one upper layer is then deposited in situ, without surface pollution. This is advantageously a layer of CeO$_2$:Gd (10 to 20 wt %) (FIG. 6) and/or STO:Nb (1 to 2 wt %). These two deposits are added in an upper layer and their function is to smooth the stack.

Another preferred embodiment relates to making YSZ in homoepitaxial YSZ: Independently of each other, the layers of YSZ can be obtained by homoepitaxy, consisting in making a stack of at least two layers with similar nature and structure, both layers being obtained following the same method. In practice, deposition is stopped after formation of the first layer while holding the temperature and under a gas flow. This means the grains on the surface of the layer can be homogenized; then deposition begins again, in good conditions, for a second layer of YSZ on a first layer. Accordingly, for equal thickness, it is more interesting to have a multilayer of the same material than a single monolayer because this limits the imperfections in the structure (irregular porosity, fracture area, etc.).

This method more generally produces multilayer systems or composites based on metal/oxide or mixed oxides.

It appears that the method as a whole (depositions and heat treatments) can be done in the vapour phase (CVD), which is a notable advantage.

The method according to the invention therefore leads to making a multilayer having at least the unit YSZ/X/YSZ. Of course, this unit can be repeated a determined number of times. Additionally, and as already stated, the trilayer can be covered by an outer smoothing layer.

In a remarkable manner, the electrolyte obtained from this method according to the invention has total thickness advantageously less than 5 micrometres, even more advantageously less than or equal to 2, even 1 micrometre.

Denser films are obtained, leading to similar permeation performance for thinner films, or even better performance.

Additionally, the ionic conductivity properties of the heterostructure are preserved, compared to the reference substances.

An SOFC type battery with an electrolyte according to the invention has an operating temperature from 500 to 800° C.

BRIEF DESCRIPTION OF THE FIGURES

The way the invention can be made and the benefits it provides will be better understood from the examples that follow, given only as indication and not limiting, using the appended figures, where.

EMBODIMENTS OF THE INVENTION

Figure 1:
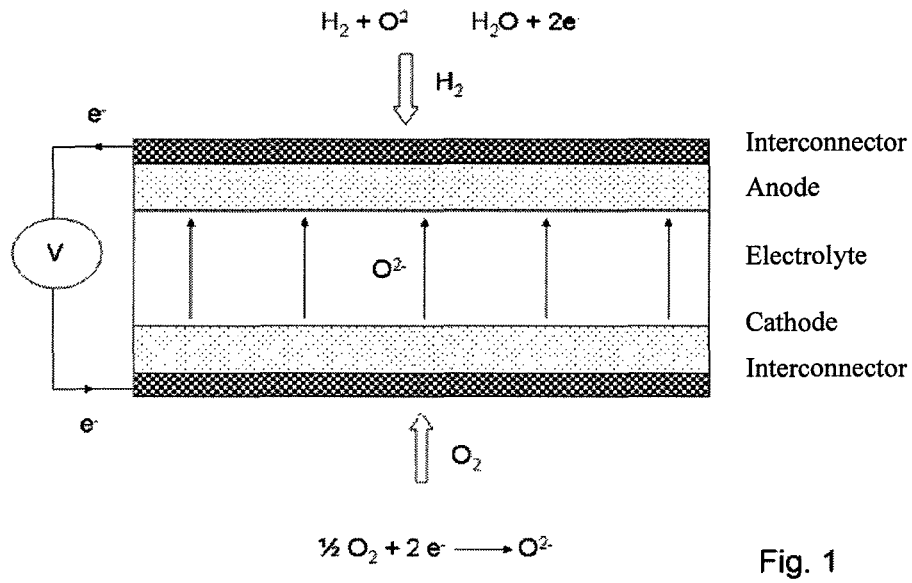
FIG. 1 schematizes the principle of function of an SOFC battery, through the representation of a single cell.
Figure 2:
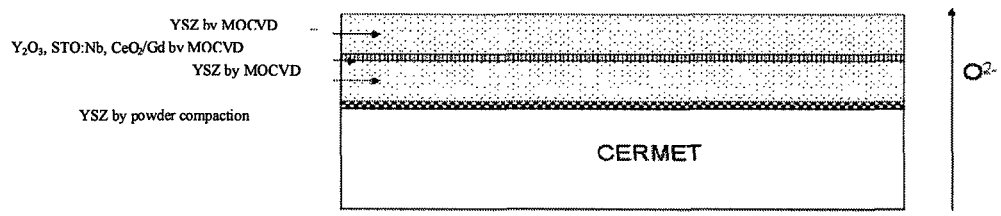
FIG. 2 shows the diagram of the structure of the electrolyte of an SOFC battery according to the invention, composed of a heterogeneous multilayer.
Figure 3:
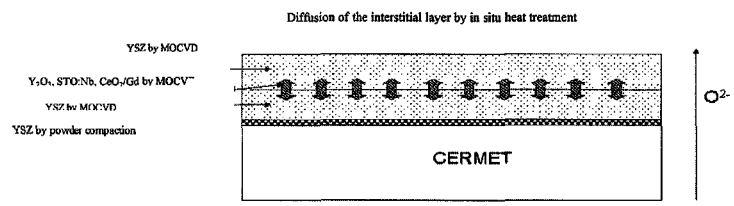
FIG. 3 shows the diagram of the structure of this same electrolyte, after heat treatment.

1. Use of a YSZ/Y$_7$O$_3$/YSZ multilayer on a cermet support:

This option is illustrated in FIGS. 2 and 3. This unit can be repeated from one to three times, with preservation of the total thickness.

The support is composed of a Ni/NiO+YSZ cermet.

Figure 8:
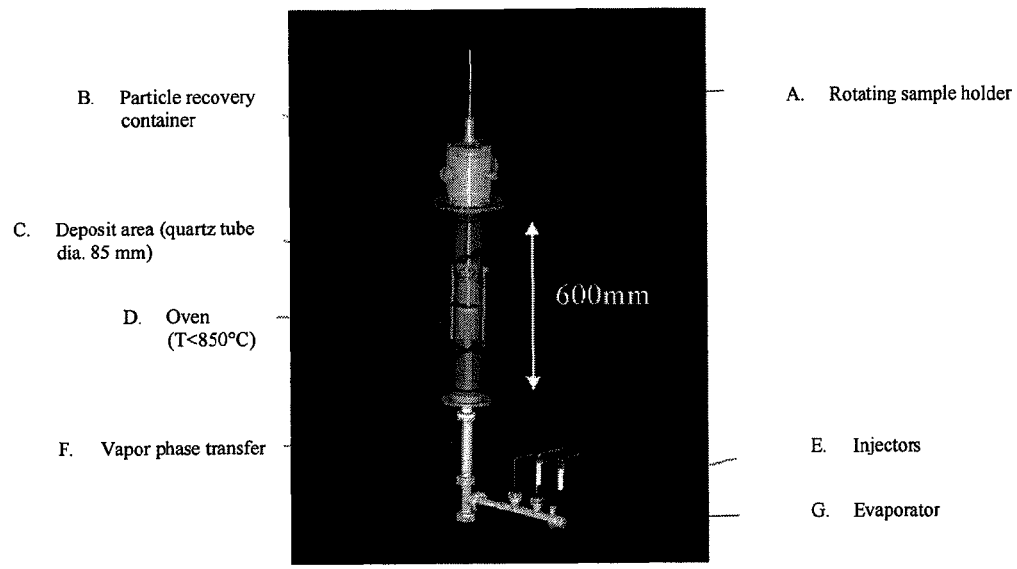
FIG. 8 illustrates an injection CVD system using the method according to the invention.

CVD deposition is done using the injection CVD system (DLI-MOCVD, "Direct Liquid Injection Metal Organic Chemical Vapour Deposition"), shown in FIG. 8.

A first chemical solution (A), composed of 5 wt % of Y in Zr in THF, is prepared and connected to an injector 1.

A second chemical solution (B), composed of Y(thd)$_3$ at 0.02 M in THF, is prepared then connected to an injector 2.

Deposition is done under the following conditions:
YSZ deposit: 620° C., O$_2$/Ar ratio between 20 and 60%, injection at 2 Hz, 3 ms, working pressure 3-8 Torrs (400 to 1067 Pa), evaporator temperature 280° C.;
Y$_2$O$_3$ deposit: 775° C., O$_2$/Ar ratio between 20 and 60%, injection at 2 Hz, 3 ms, working pressure 3-8 Torrs (400 to 1067 Pa), evaporator temperature 280° C.

Figure 4:
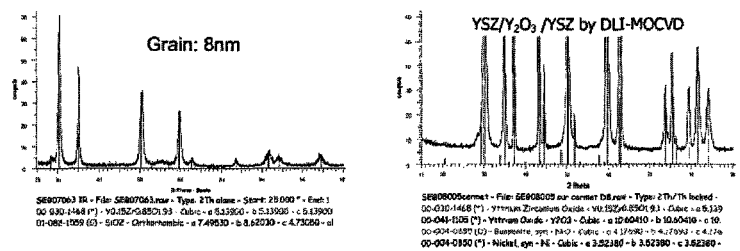
FIG. 4 corresponds to two diffraction spectra for electrolytes YSZ and YSZ/Y$_2$O$_3$/YSZ on NiO cermet.

FIG. 4 shows two diffraction spectra of layers obtained before heat treatment: on the first, from the peak width grain size can be estimated to be 8 nanometres, which implies higher density. The second shows that a trilayer has indeed been formed.

Figure 5:
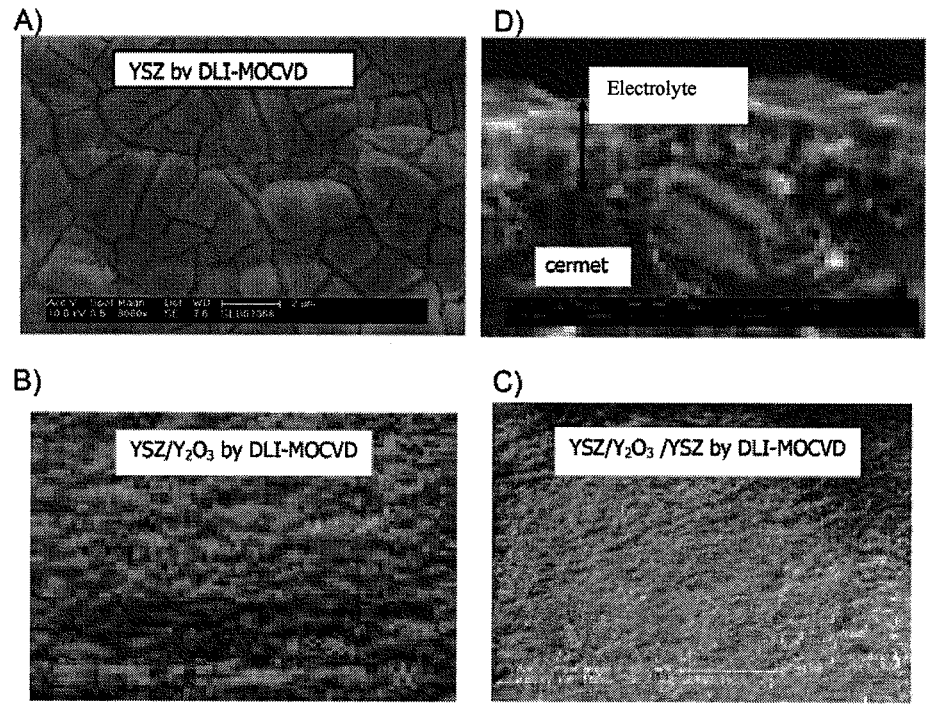
FIG. 5 shows images obtained by scanning electron microscopy (SEM) for electrolytes YSZ (A), YSZ/Y$_2$O$_3$ (B) and YSZ/Y$_2$O$_3$ (C) on NiO cermet seen from above, and a section (D) of the trilayer electrolyte.
Figure 6:
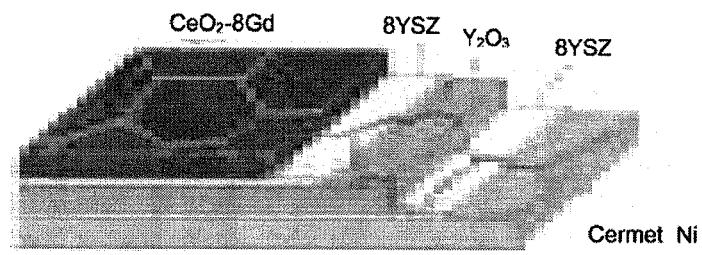
FIG. 6 is a section view of an electrolyte composed of a heterogeneous multilayer stack according to the invention.

FIG. 5 shows photos taken before heat treatment. The views from above comparing YSZ, YSZ/Y$_2$O$_3$ and YSZ/Y$_2$O$_3$/YSZ show that the deposit is smoother for the trilayer.

The whole undergoes an in situ heat treatment to reoxygenate the cermet and diffuse the Y$_2$O$_3$ within the two layers of less than stoichiometric yttria stabilized zirconium (YSZ), with Y$_2$O$_3$ less than 50 nanometres. This leads to the creation of a diffuse interface, as shown in FIG. 3.

2. Use of a YSZ/CeO$_2$:Gd/YSZ multilayer on a cermet support:

In a similar way, a first chemical solution (A), composed of 8 wt % of Y in Zr in THF, is prepared and connected to an injector 1.

A second chemical solution (B), composed of Ce(thd)$_4$ at 0.02 M and Gd(thd) at 0.004 M in THF, is prepared then connected to an injector 2.

The characteristics of the deposits are as follows:
YSZ deposit: 620° C., O$_2$/Ar ratio between 20 and 60%, injection at 2 Hz, 3 ms, working pressure 3-8 Torrs (400 to 1067 Pa), evaporator temperature 280° C.;

$CeO_7$ deposit: 800° C., $O_2$/Ar ratio between 20 and 60%, injection at 2 Hz, 3 ms, working pressure 3-8 Torrs (400 to 1067 Pa), evaporator temperature 280° C.

The growth rate is 2.6 μm/h

Figure 7:
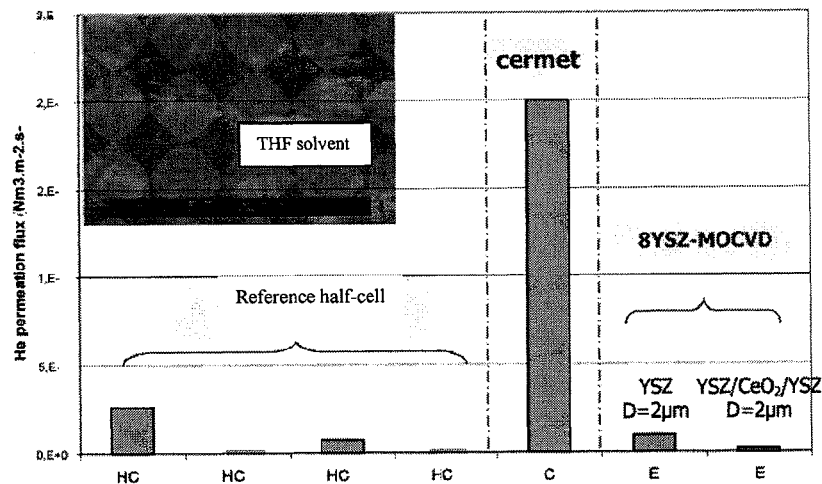
FIG. 7 illustrates the results of permeation tests for the various electrolytes obtained after heat treatment.

FIG. 7 reveals similar permeation as for the best reference substances for a total thickness made by MOCVD of 2 micrometres (instead of 5 micrometres for the references). Accordingly, the structure obtained is a denser film leading to similar permeation performance for films two or three times thinner for pure zirconium, and twice as powerful for the YSZ/$CeO_2$:Gd/YSZ heterostructure.

3. Use of a YSZ/SrTiO₃:Nb/YSZ multilayer on a cermet support:

In a similar way, a first chemical solution (A), composed of 8 wt % of Y in Zr in THF, is prepared and connected to an injector 1.

A second chemical solution (B), composed of Sr(thd)$_2$ at 0.0175 M, Ti(O$^i$Pr) at 0.0137 M and Nb at 0.0003 M in monoglyme, is prepared then connected to an injector 2.

The characteristics of the deposits are as follows:

YSZ deposit: 620° C., $O_2$/Ar ratio between 20 and 60%, injection at 2 Hz, 3 ms, working pressure 3-8 Torrs (400 to 1067 Pa), evaporator temperature 280° C.;

$SrTiO_3$ deposit: 700° C., $O_2$/Ar ratio between 20 and 60%, injection at 2 Hz, 3 ms, working pressure 3-8 Torrs (400 to 1067 Pa), evaporator temperature 280° C.

Growth rate of 2 μm/h. 35 drops are injected under argon flow only, then the reactive carrier gas ($O_2$) is added progressively. Between deposits, since the injection is stopped, the system is put under vacuum at 0 Torr (Pa) and the samples are subjected to a 50/50 $O_2$/Ar gas flow for 10 minutes. The Sr/Ti ratio is set at 1.28.

REFERENCES (1) B. C. H. Steele, *J. Materials Science,* 36, (2001), 1053

(2) T. Mori, J. Drennan, Y. Wang, J. H. Lee, J. G. Li, T. Ikegami, *J. Electrochem. Soc,* 150(6), 2003, A665-73.

(3) T. Mori, T. Ikegami, H. Yamamura, *J. Electrochem. Soc,* 146,(12), 1999,4380-85.

(4) L. Vasylechko, V. Vashook, D. Savytskii, A. Senyshyn, R. Niewa, M. Knapp, U. Ullmann, M. Berkowski, A. Matkovskii, U. Bismayer, *J. Solid State Chem,* 172, 2003, 396.

(5) N. Q. Minh et al, Science and Technology of Ceramic Fuel Cells, Elsevier Science B.V, (1995).

(6) S. Donet, F. Weiss, J. P. Senateur, P. Chaudouet, A. Abrutis, A. Teiserskis, Z. Saltyte, D. Selbmann, J. Eickmeyer, O. Stadel, G. Wahl, C. Jimenez, U. Miller, *Physica C* 372-376 (2002): 652.

(7) S. Donet, C. Jimenez, F. Weiss, Transworld Research Network-Recent Res. Deve. physics, 5 (2004).

The invention claimed is:

1. A method for manufacturing an electrolyte for an SOFC battery comprising a CVD (chemical vapor deposition) deposition, on a substrate, of a stack of at least three layers of materials YSZ/X/YSZ, X being a different material than YSZ; wherein the X layer is diffused within both YSZ layers by heat treating the stack of at least three layers of materials YSZ/X/YSZ creating a diffuse interface between the layers of YSZ.

2. The method for manufacturing an electrolyte for an SOFC battery according to claim 1, wherein the material X is selected from the group consisting of: $Y_2O_3$, $CeO_2$:Gd, $SrTiO_3$:Nb, $Bi_2O_3$, or a mixture of these materials.

3. The method for manufacturing an electrolyte for an SOFC battery according to claim 1, wherein the YSZ layers are made by chemical vapour deposition of precursor Y(thd)$_3$ in Zr(thd)$_2$.

4. The method for manufacturing an electrolyte for an SOFC battery according to claim 2, wherein the X layer is made by chemical vapour deposition of the precursors selected from the group consisting of:

Y(thd)$_3$;

Ce(thd)$_3$ and Gd(thd)$_3$;

Sr(thd)$_2$, Ti(O$^i$Pr) and Nb(thd)$_4$, respectively.

5. The method for manufacturing an electrolyte for an SOFC battery according to claim 1, wherein the material X is deposited with a thickness from 10 to 100 nanometres.

6. The method for manufacturing an electrolyte for an SOFC battery according to claim 1, wherein the substrate comprises a cermet.

7. The method for manufacturing an electrolyte for an SOFC battery according to claim 1, wherein the deposition of three layers is repeated, so as to obtain a multilayer stack having a repeated YSZ/X/YSZ unit.

8. The method for manufacturing an electrolyte for an SOFC battery according to claim 1, wherein an upper smoothing layer is deposited.

9. An electrolyte membrane for an SOFC battery comprising at least two YSZ layers separated by a diffuse interface made of a material X, X being a different material than YSZ, wherein the membrane is less than 5 micrometers thick.

10. An SOFC battery comprising an electrolyte membrane according to claim 9.

11. The method for manufacturing an electrolyte for an SOFC battery according to claim 5, wherein said thickness is 500 nanometres.

12. The method for manufacturing an electrolyte for an SOFC battery according to claim 6, wherein said cermet comprises Ni/NiO+YSZ.

13. The method for manufacturing an electrolyte for an SOFC battery according to claim 1, wherein said heat treatment is performed at a temperature of 650 to 850° C.

14. The method for manufacturing an electrolyte for an SOFC battery according to claim 8, wherein the smoothing layer comprises $CeO_2$:Gd or STO:Nb.

15. The electrolyte membrane for an SOFC battery according to claim 9, wherein the membrane is less than or equal to 2 micrometres thick.

16. The SOFC battery according to claim 10, having an operating temperature from 500 to 800° C.

17. The electrolyte membrane for an SOFC battery according to claim 9, wherein the material X is selected from the group consisting of: $Y_2O_3$, $CeO_2$:Gd, $SrTiO_3$:Nb, $Bi_2O_3$, or a mixture of these materials.

* * * * *